(12) United States Patent
Zunjarrao

(10) Patent No.: US 10,887,567 B2
(45) Date of Patent: Jan. 5, 2021

(54) CAMERA COLOR IMAGE PROCESSING

(71) Applicant: Microsoft Technology Licensing, LLC, Redmond, WA (US)

(72) Inventor: Vickrant J. Zunjarrao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 30 days.

(21) Appl. No.: 16/358,679

(22) Filed: Mar. 19, 2019

(65) Prior Publication Data

US 2020/0304767 A1 Sep. 24, 2020

(51) Int. Cl.
*H04N 9/73* (2006.01)
*H04N 9/64* (2006.01)

(52) U.S. Cl.
CPC ............. *H04N 9/735* (2013.01); *H04N 9/646* (2013.01)

(58) Field of Classification Search
CPC .......... H04N 9/735; H04N 9/646; H04N 9/73; H04N 9/67; H04N 1/6086; H04N 9/045
USPC ...................................................... 348/223.1
See application file for complete search history.

(56) References Cited

U.S. PATENT DOCUMENTS

| | | | |
|---|---|---|---|
| 4,825,246 A | 4/1989 | Fukuchi et al. | |
| 4,845,548 A | 7/1989 | Kohno et al. | |
| 8,493,514 B2 * | 7/2013 | Choi | H04N 9/67 |
| | | | 348/655 |
| 9,386,289 B2 * | 7/2016 | Tuna | H04N 9/646 |
| 9,854,218 B2 * | 12/2017 | Yu | H04N 9/735 |
| 10,510,281 B2 * | 12/2019 | Shin | G09G 3/2003 |
| 2002/0110763 A1 | 8/2002 | Matsumoto et al. | |
| 2009/0021647 A1 | 1/2009 | Choi et al. | |
| 2014/0168463 A1 | 6/2014 | Tamura | |
| 2014/0285477 A1 | 9/2014 | Cho et al. | |
| 2015/0312540 A1 * | 10/2015 | Tuna | G06T 7/90 |
| | | | 348/223.1 |
| 2016/0241830 A1 | 8/2016 | Yu et al. | |
| 2018/0114476 A1 * | 4/2018 | Shin | G06T 11/001 |
| 2019/0174107 A1 * | 6/2019 | Miyake | G06T 7/90 |

OTHER PUBLICATIONS

"Color Temperature", Retrieved from: https://web.archive.org/web/20180315063411/http:/hyperphysics.phy-astr.gsu.edu/hbase/phyopt/coltemp.html, Mar. 15, 2018, 4 Pages.

(Continued)

*Primary Examiner* — Pritham D Prabhakher

(57) ABSTRACT

An image processing system receives image data acquired by an imaging device, and separates one or more achromatic colors from one or more chromatic colors in the received image data. The achromatic colors and the chromatic colors are processed based at least on a color temperature and lux to generate an adjusted color appearance for the achromatic colors by applying one or more defined weight values associated with the achromatic colors or the chromatic colors, respectively. The defined weight values associated with the one or more achromatic colors are different than the defined weight values associated with the one or more chromatic colors. A final image is generated using the adjusted color appearance for the one or more achromatic colors and the adjusted color appearance for the one or more achromatic colors that is more aligned with human vision and cognitive systems.

20 Claims, 8 Drawing Sheets

(56) References Cited

OTHER PUBLICATIONS

Garcia, et al., "Differentiating Biological Colours with Few and Many Sensors: Spectral Reconstruction with RGB and Hyperspectral Cameras", In Journal of PLoS ONE, vol. 10, Issue 5, May 12, 2015, 20 Pages.
Sternheim, et al., "Achromatic and chromatic sensation as a function of color temperature and retinal illuminance", In Journal of the Optical Society of America A, Optics and image science, Jun. 1993, 1 Page.
"International Search Report and Written Opinion Issued in PCT Application No. PCT/US2020/021933", dated Jun. 8, 2020, 12 Pages.

* cited by examiner

| CCT | COLOR APPEARANCE | | LUX LEVEL | | LUX WEIGHT | | CHROMATIC LEVEL | | CHROMA WEIGHT | |
|---|---|---|---|---|---|---|---|---|---|---|
| | R/G | B/G | LOW | HIGH | W1(LOW) | W2(HIGH) | C1(CHROMATIC) | C2(ACHROMATIC) | Cw1 | Cw2 |
| 2400 | 1.66 | 0.18 | 30 | 200 | 0.6 | 1 | | | 0.7 | 1 |
| 2856 | 1.48 | 0.29 | 40 | 200 | 0.8 | 1 | 0.35 | 1 | 0.75 | 1 |
| 3300 | 1.30 | 0.37 | 50 | 300 | 0.85 | 1 | 0.30 | 1 | 0.80 | 1 |
| 4000 | 1.06 | 80 | 80 | 300 | 0.85 | 1 | 0.30 | 1 | 0.80 | 1 |
| 5000 | 0.99 | 0.85 | 100 | 300 | 0.9 | 1 | 0.30 | 1 | 0.95 | 1 |
| 6500 | 0.79 | 1.05 | 200 | 400 | 0.9 | 1 | 0.30 | 1 | 0.95 | 1 |
| 8000 | 0.70 | 1.20 | 60 | 200 | 0.95 | 1 | 0.30 | 1 | 0.80 | 1 |
| 10000 | 0.66 | 1.40 | 60 | 200 | 0.95 | 1 | 0.30 | 1 | 0.7 | 1 |

CAMERA COLOR IMAGE PROCESSING

BACKGROUND

Camera color image processing is used to generate color images based on images captured by a camera. The image processing transforms sensed visual data into image data to generate the color images. Conventional processing techniques treat all colors in the same manner or same direction. However, human vision and cognitive systems treat the colors based on chromatic attributes of the colors, as well as memory of the color. The simple mathematical model and/or matrix used in conventional processing techniques is not capable of transforming the acquired visual data into images that are a true representation of human vision. For example, all lighting conditions are not neutral white and most of the lighting conditions have some color cast associated therewith, which are not accurately represented using the conventional processing techniques.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for image processing comprises receiving image data acquired by an imaging device, and separating one or more achromatic colors from one or more chromatic colors in the received image data. The computerized method further comprises processing the one or more achromatic colors based at least on a color temperature and lux to generate an adjusted color appearance for the one or more achromatic colors by applying one or more defined weight values associated with the one or more achromatic colors. The computerized method also includes processing the one or more chromatic colors based at least on a color temperature and lux to generate an adjusted color appearance for the one or more chromatic colors by applying one or more defined weight values associated with the one or more chromatic colors. The one or more defined weight values associated with the one or more achromatic colors are different than the one or more defined weight values associated with the one or more chromatic colors. The computerized method further comprises generating a final image using the adjusted color appearance for the one or more achromatic colors and the adjusted color appearance for the one or more achromatic colors.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The computing devices and methods described herein are configured to process image data with a camera color imaging process (e.g., processing algorithm) based on complex human visual and cognitive non-linear processing. A camera color image processing pipeline defines a processing algorithm based on human visual and cognitive processing to provide an improved camera experience (for photos and videos) to users, such as during video conference calls.

All lighting conditions are not neutral white and most of the lighting conditions have some color cast associated therewith. For example, tungsten light (CIE A) has a strong yellow cast, horizon light (2400 K) has an orange cast, and a cloudy sunlight (CIE D65) has a bluer cast. The human visual system adapts to these lighting conditions partially and accordingly, white paper (achromatic objects) appear yellower under tungsten lighting and bluer under cloudy sunlight. However, due to cognitive processing, chromatic objects have less impact of color casts, for example, a red apple appears almost the same color irrespective of lighting conditions. This complex human visual phenome has been adapted by the present disclosure to provide camera color processing by creating separate custom color appearance models for achromatic colors and chromatic colors, which results in an improved user experience.

In some examples, the camera color image processing pipeline enhances the visual experience during video conference calls, including providing skin tone reproduction using face-based (object-based) information, as well as an improved overall camera image quality and photography experience under different illuminant conditions. As such, an image is generated that is more consistent with the human visual system.

The present disclosure thereby provides a configured image processing pipeline having the capability to generate images that better mimic human visual and cognitive processing. In this manner, when a processor is programmed to perform the operations described herein, the processor is used in an unconventional way, and allows for the more accurate generation of images corresponding to human visual and cognitive processing, which thereby provides an improved user experience.

Figure 1:
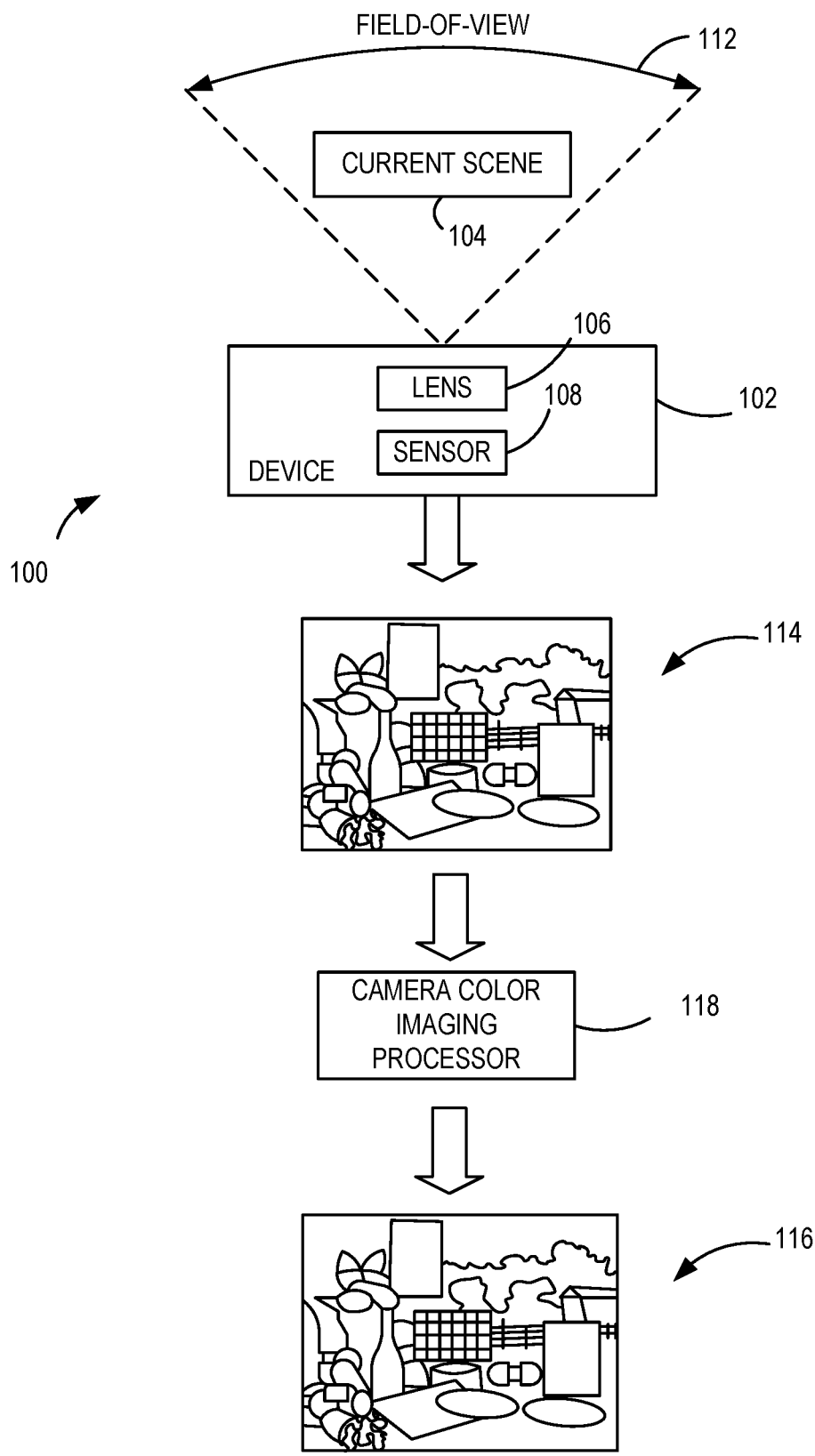
FIG. 1 is a block diagram illustrating use of a system configured for camera color image processing according to an embodiment.

FIG. 1 is an exemplary block diagram illustrating use of a system 100 for generating images (e.g., video image), particularly images with improved qualities that mimic human visual and cognitive processing. A device 102 (e.g., a mobile phone, tablet, laptop, video camera, etc.) acquires a plurality of images of a scene 104 (illustrated as a current scene, such as an image including one or more objects therein) using a lens 106 and a sensor 108 (e.g., a charge-coupled device (CCD) or a complementary metal-oxide-semiconductor (CMOS) active pixel sensor) of the device 102. As should be appreciated, the sensor 108, which in one example is a camera sensor formed from silicon, "sees" the scene 104 differently than human eyes. While optics and filters can alter the images of the scene 104 illustrated as the image 114 being acquired, the images still deviate from images seen by human eyes having human visual and cognitive processing. The present disclosure processes the acquired image data to generate images that better mimic human visual and cognitive processing. That is, the illustrative image 116 better represents what the eyes of a human would be seeing if viewed directly instead of through the device 102. It should be noted that the device 102 in some examples is positioned at a remote location and generates images that are viewed by a person at a different location, such as in a video conferencing setting. Thus, the current scene 104 in a field-of-view 112 of the device 102 is imaged having a better representation of images generated by human visual and cognitive processing.

In the illustrated example, a camera color imaging processor 118 (which can form part of the device 102 or be separate from the device 102) is configured to process image data acquired by the device 102 to generate images have improved visual qualities. That is, the camera color imaging processor 118 is configured in various examples to have a camera color image processing pipeline implemented based on human visual and cognitive processing to provide a camera experience (for photos and videos) for different applications (e.g., video conference calls). In one example, the camera color imaging processor 118 is configured to implement a processing pipeline that performs achromatic-chromatic separation of the acquired image data to separately process the achromatic colors and the chromatic colors to provide automatic white balance (AWB) control. As a result, raw "radiance" images are transformed into adapted "perceptual" images.

More particularly, the camera color imaging processor 118 is operable to perform AWB control to simulate the white balance of the human eyes. The camera color imaging processor 118 in one example implements a camera color imaging algorithm based on complex human visual and cognitive non-linear processing instead of a conventional simple mathematical model and/or matrix. The camera color imaging processor 118 performs AWB control that allows for different gains to be applied to the achromatic colors than to the chromatic colors. The processing performed by the camera color imaging processor 118 accounts for illumination variations, such as phases of daylight, variations in man-made light sources (e.g., different types of lights, sample-to-sample variations, etc.), mixed illumination conditions (e.g., more than one light source, shadows, etc.), etc.

Various examples obtain WB gains from the white point, as follows:

White point R/G 0.682 and B/G 0.714;
Gain R=1/0.682=1.661;
Gain Gr=1;
Gain Gb=1; and
Gain B=1/0.714=1.400

Using these WB gains, a chromatic adaption model output is provided that generates adapted "perceptual" images. In some examples, an adjusted white point R/G is based on image processing by the camera color imaging processor 118 that includes achromatic color weights and chromatic color weights that are separately defined. As described in more detail herein, a tuning table is used by the camera color imaging processor 118 to define the various weights and parameters for the new R/G (or new B/G), where R represent red color, G represents green color, and B represents blue color.

Figure 2:
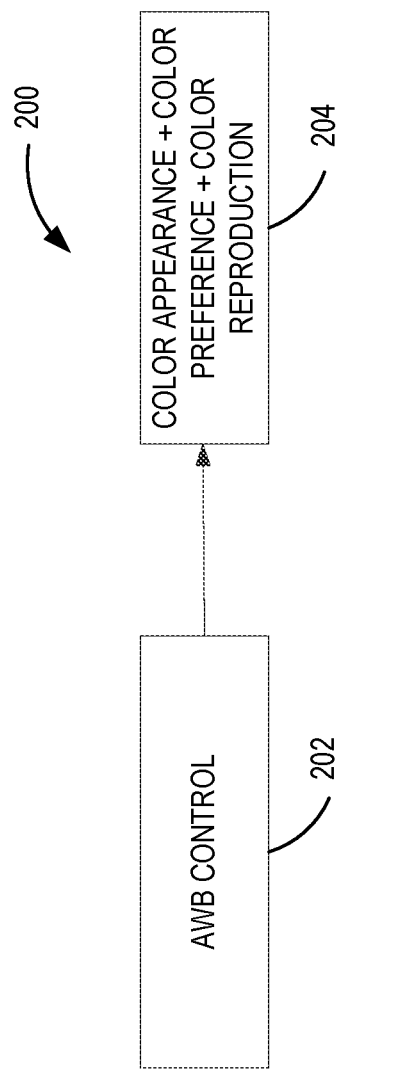
FIG. 2 is a block diagram of illustrating an automatic white balance control according to an embodiment.

In one example, as illustrated in FIG. 2, a color processor 200 is configured to process images to generate adapted "perceptual" images based at least in part on color temperature and lux. The color temperature of a light source generally refers to the temperature of an ideal black-body radiator that radiates light of comparable hue to that of the light source. Lux is a measure of luminous emittance and generally refers to the number of lumens given off by a surface per square area, regardless of how that light is distributed in terms of the directions in which the light is emitted. A perfectly white surface with one lux falling on that surface emits one lux. Various examples use color temperature and lux as part of a color appearance/color preference model. As illustrated in FIG. 2, an AWB control 202 is output to a model 204, which is based on color appearance, color preference and color reproduction, whereas conventional approaches are based only on color appearance and color preference. The present disclosure allows different gains to be applied across the achromatic/chromatic bands based on color temperature and lux. However, it should be appreciated that other image characteristics can be used to perform the processing described herein.

Figure 3:
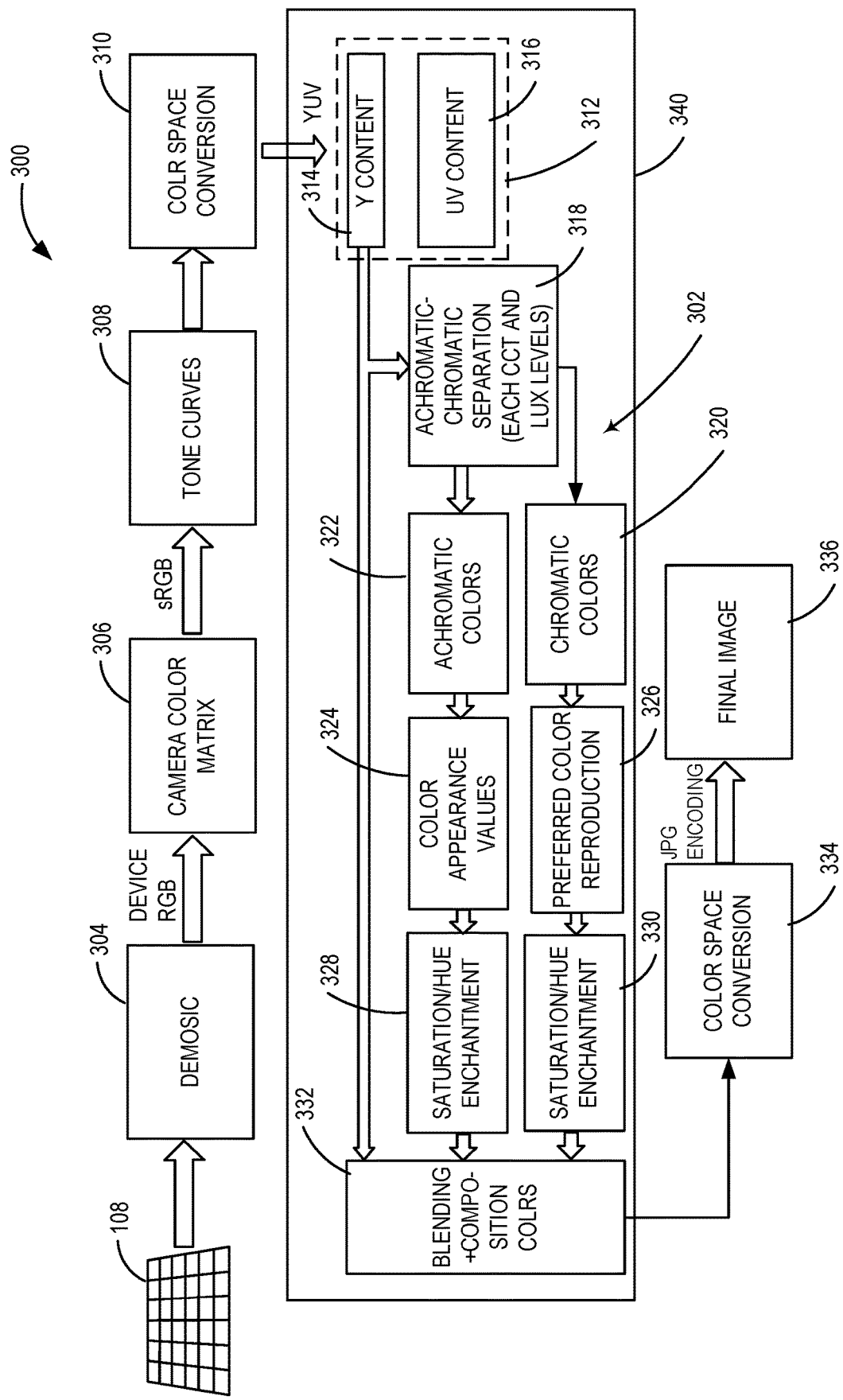
FIG. 3 is a block diagram of a system having a camera color image processing pipeline according to an embodiment.

FIG. 3 illustrates an image color processing system 300 having a camera color image processing component 340 with a camera color image processing pipeline 302 according to one example. It should be noted the image color processing system 300 can include additional, fewer, or alternate components. The components shown are provided for ease of illustration. The image color processing system 300 receives image data from a sensor, such as the sensor 108 (shown in FIG. 1). The acquired image data is processed by a demosaic processing component 304. The demosaic processing component 304 performs demosaicing that is a digital image process to reconstruct a full color image from the incomplete color samples output from the image sensor 304 (and optionally overlaid with a color filter array (CFA)). Thus, the demosaic processing component 304 performs color reconstruction.

A camera color matrix 306 is then used for color correction to the standard RGB (sRGB) color space from the device RGB. The camera color matrix 306 can be any suitable matrix in the camera color technology. That is, the raw sensor data is transformed from the camera color space to the sRGB. Tone curves 308 are used on the sRGB image data to adjust the exposure, amount of light, and tone of the data. Any tone curves in the image processing technology can be used.

A color space conversion 310 is performed on the adjusted tone sRGB image data. The color space conversion 310 converts the image data between color spaces using conversion parameters. In the illustrated examples, the conversion parameters are configured to convert the sRGB image data to YUV image data. That is, the color space conversion 310 converts the red, green, blue color system to the YUV color space for use in the camera color image processing pipeline 302. The use of the YUV color space instead of a direct RGB representation of the image data allows for reduced bandwidth in transmitting the data through the camera color image processing pipeline 302 (e.g., reduced bandwidth for chrominance components). It should be noted that Y stands for the luminance component (brightness), and U and V stand chrominance (color) components. It should also be noted that other color models or color encoding can be used and are contemplated by the present disclosure. Thus, the various examples can be used in any color space. For example, conversion can be made into the YCbCr color space, the CIELAB color space, or the LCh color space, the HSV color space, or the HSL color space, among others. The present disclosure can be implemented, for example, with any linear or non-linear image color space.

The color space conversion 310 thereby converts the image data from a color space of the camera that captured and encoded the image data (e.g., a three-color model such as RGB) to a color space for color image processing, such as YUV. That is, in some examples, pixel data is converted from an image space wherein pixels are considered in terms of three color channels (red, blue, green) with each having a corresponding intensity, to a color space wherein pixels are considered in terms of two colors (e.g., chrominance or chroma channels) and one achromatic channel representing the overall light of the pixel in terms of brightness or lightness. For example the two chrominance channels can be red and blue channels. The achromatic channel can be referred to as the luminance or luma channel. Thus, in the YUV color space, Y refers to the luminance channel, U the blue chrominance channel and V the red chrominance channel.

The YUV image data is then processed by the camera color image processing pipeline 302. This processing includes separating the components by a splitter 312, which is configured to separate the luminance component (content) from the chrominance components (content). That is, the splitter 312 is configured to separate the brightness content from the color content of the YUV image data to thereafter allow for separate processing of the achromatic colors and chromatic colors, including separately adjusting the achromatic colors and chromatic colors based on color temperature and lux. It should be note that the U and V components correspond to a color difference (saturation) for the image pixels (e.g., shift the color of a pixel without altering the brightness). In one example, signals corresponding to the UV content 316 are separated from the Y content 314 using signal splitting techniques in the signal processing technology. That is, achromatic and chromatic separation 318 is performed, such that signals corresponding to the YUV data are split by a signal splitter in one example to result in the Y content 314 that is separate from the UV components 316, with the UV components 316 separated into achromatic color components and chromatic color components.

The camera color image processing pipeline 302 thus separates the achromatic colors 322 from the chromatic colors 320. The separation allows for separate processing of the achromatic colors 322 and the chromatic colors 320 (e.g., the achromatic image components and the chromatic image components), which are separately adjusted based on color temperature and lux levels. In one example, the adjustments are performed by thresholding based on correlated color temperature (CCT) and lux levels to adjust the achromatic colors 322 and the chromatic colors 320. The separation of the achromatic colors 322 and the chromatic colors 320 is performed for example, by one of a grid based technique, a pixel based technique, an object and scene detection technique, a machine learning separation technique, among others. In one example, a detection thresholding technique is used that can be sensor response based, YUV based, or empirically based (lab based). However, it should be appreciated that any suitable method can be used to separate the achromatic colors 322 and the chromatic colors 320.

As can be seen, in the illustrated example, the UV content 316 is camera color image processed by the camera color image processing pipeline 302. While the Y content 314 is not processed by the camera color image processing pipeline 302, this luminance component is used as an input to the achromatic and chromatic separation 318. That is, the color content is camera color image processed by the camera color image processing pipeline 302. It should be noted that the parameters, characteristics, properties, etc. used to perform the separation can be tuned or adjusted. Additionally, the separation can be performed on a set of image data, such as a set of pixels, on a pixel basis, or based on other sets of the image data.

The achromatic colors 322 and the chromatic colors 320 are separately processed in some examples to better approximate human vision and cognitive systems (e.g., in a video to have colors as a human would see based on different lighting conditions). In one example, the achromatic colors 322 are processed based on color appearance values 324 and the chromatic colors 320 are processed based on defined preferred color reproduction values 326. That is, different values (e.g., weighting values) are separately applied to the image data corresponding to the achromatic colors 322 and the chromatic colors 320, such that saturation/hue enhancement 328 of the achromatic colors 322 and saturation/hue enhancement 330 of the chromatic colors 320 is provided.

Figure 4:
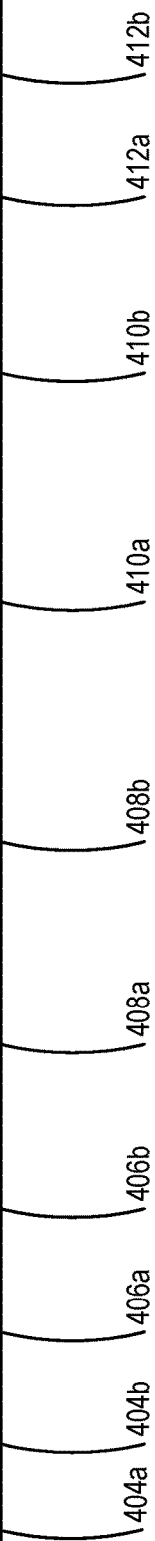
FIG. 4 illustrates a tuning table according to an embodiment.

More particularly, various examples use a tuning table 400 as shown in FIG. 4 to adjust the achromatic colors 322 and the chromatic colors 320, namely to perform saturation/hue enhancement 328 and saturation/hue enhancement 330 based on color appearance values 324 and defined preferred color reproduction values 326. In the illustrated example, the tuning table 400 defines respective values for each of a plurality of color temperature levels corresponding to CCT values in a column 402 of the table 400. It should be noted that the CCT values in the tuning table 400 correspond to values for different types of light sources (e.g., incandescent, LED, etc.) in one example. However, it should be appreciated that the CCT values can be adjusted to include fewer or additional values. That is, different values (or ranges of values) can be defined by adjusting the CCT values or the number of CCT values in the column 402. In some examples, the AWB control 202 is configured to detect the CCT using color temperature sensing techniques in the image processing technology. That is, the AWB control 202 is configured to acquire color temperature information that is used to define the weights to be used within the tuning table 400.

For each CCT value, a corresponding values for color appearance, lux level, lux weight, chromatic level, and chroma weight are defined in columns 404a and 404b, 406a and 406b, 408a and 408b, 410a and 410b, and 412a and 412b, respectively. In various examples, the values in each of the columns are determined empirically, such as based on testing or experimentation. In some examples, modeling is used in the determination of the values. Thus, the values in the tuning table 400 are tunable to generate different color image processing results.

More particularly, the color appearance values in the columns 404a and 404b define a desired appearance for the colors corresponding to CCT level. That is, these values define how the colors should look (perceptual aspects of human color vision based on the lighting conditions). The lux level values in the columns 406a and 406b define light or luminance thresholds. That is, these values define low light and non-low light (bright) light conditions in some examples. The lux weight values in the columns 408a and 408b define a luminance weight value corresponding to the lux level values. That is, the weights are applied in some examples depending on whether the there is a low light condition or a non-low light (bright or high) light condition. The chromatic level values in columns 410a and 410b define whether a color is in the achromatic colors 322 or the chromatic colors 320. That is, these values define levels above and below which (i.e., above C2 and below C1) the color is considered within the achromatic colors 322 and the chromatic colors 320, respectively. Measured values falling between these levels are considered to have a color that is part of both the achromatic colors 322 and the chromatic colors 320. The chroma weight values in columns 412a and 412b define the weight value corresponding to the achromatic colors 322 or the chromatic colors 320. That is, the chroma weights are the value to be applied depending on whether the color is within the achromatic colors 322 or the chromatic colors 320.

It should be appreciated that the values in each row of the tuning table 400 corresponding to each of the different CCT values are used for processing both the achromatic colors 322 and the chromatic colors 320. But, some of the values are used for processing only one of the achromatic colors 322 or the chromatic colors 320 as will be discussed in more detail below. In the various examples, the values in each row correspond to the desired characteristic for each color temperature (CCT) that better mimic human visual and cognitive system processing. That is, when viewing video images (e.g., a video conference), the colors generated and displayed according to the present disclosure provide an improved user experience in that the colors better represent what the user would see if directly viewing the scene being image, instead of the video displayed images acquired by the camera device.

The various values in the tuning table 400 can be changed or tuned as desired or needed. For example, the color appearance defined in columns 404a, 404b can be tuned to adjust the color appearance by changing any of the values of RGB to change the ratio value in these columns. That is, the color appearance defined in columns 404a, 404b define how a person desires to see the image. The values of the color appearance defined in columns 404a, 404b are based, in some examples, on survey data, experimentation in capturing data in various lighting conditions, etc. However, the values for the color appearance defined in columns 404a, 404b are definable based on other factors or criteria in order to produce an adjusted final image that appears more "realistic" to the viewer. In some examples, a camera engineer is able to tune the final image by adjusting the values in the tuning table 400.

Thus, it should be appreciated that the values in the tuning table 400 are merely for example and not limiting on the present disclosure. Moreover, for CCT values that fall between the values in column 402, the row having the value closest to the measured CCT value can be used in one example to perform the color image processing. However, other methods can be used. For example, adjusted values are determined in some examples using interpolation between two values for the CCT. That is, if the measured CCT value (such as by the AWB 202) is between two CCT values in the column 402 of the table 400, then interpolation can be performed to determine, for example, the corresponding weight values (e.g., Cw1, Cw2, L1, L2) to be applied.

Examples for processing the received image data to perform saturation/hue enhancement 328 and saturation/hue enhancement 330 based on color appearance values 324 and defined preferred color reproduction values 326 will now be described. It should be appreciated that the examples are merely for illustration of calculations performed based on possible lux and chromatic levels. As one example for processing achromatic colors 322:

if C≤C1 and
if L≤L1, then color adjustment (a new R/G) is calculated as:

$$\left(\frac{R}{G}\right)_{new} = W1 \; x \left(\frac{R}{G}\right) X \; CW1 \qquad \text{Eq. 1}$$

In this equation, the new color appearance $$\left(\frac{R}{G}\right)_{new}$$

is determined by weighting the current color appearance value $$\left(\frac{R}{G}\right)$$

using the low lux weight W1 and the chromatic level C2 for the achromatic color. It should be appreciated that L1 corresponds to the Low lux level and L2 corresponds to the High lux level in the tuning table 400. The new color appearance $$\left(\frac{R}{G}\right)_{new}$$

defines the desired response. That is, the new color appearance $$\left(\frac{R}{G}\right)_{new}$$

defines a color appearance that is more desirable or ideal, such as would be expected if the image were captured by a human's eyes and subjected to human visual and cognitive processing. The new color appearance $$\left(\frac{R}{G}\right)_{new}$$

is output to an image processor in various examples to generate the final image 336 (shown in FIG. 3).

It should be appreciated that a new B/G value is similarly calculated using Equation 1. Additionally, in a similar manner, when processing chromatic colors 320, the chromatic values are used, including C1. That is, for the different values, such as for the chromatic level, different weighting values are provided in the tuning table 400 for each of the achromatic colors 322 and the chromatic colors 320. Thus, the color image processing of the present disclosure is differently performed (e.g., differently weighted) for the achromatic colors 322 and the chromatic colors 320, such that the saturation/hue enhancement 328 and saturation/hue enhancement 330 better mimic human vision, including human visual and cognitive non-linear processing.

As another example:
if L≤L1 and
if C<C<C2, then color adjustment (a new R/G) is calculated as:

$$\left(\frac{R}{G}\right)_{new} = W1 \times \left(\frac{R}{G}\right) \times \left(\left(\frac{C2-C}{C2-C1}\right) \times Cw1\right) + \left(\left(\frac{C-C1}{C2-C1}\right) \times Cw2\right) \quad \text{Eq. 2}$$

In this equation, the new color appearance $$\left(\frac{R}{G}\right)_{new}$$

is determined by weighting the current color appearance value $$\left(\frac{R}{G}\right)$$

using the low lux weight W1 in combination with weights for achromatic and chromatic colors (Cw1 and Cw2, respectively). It should be noted that W1, which is the low lux level value, is used because L≤L1. If L>L1 the high lux level value is used. In Equation 2, Cw1 and Cw2 are adjusted based on $$\left(\frac{C2-C}{C2-C1}\right) \text{ and } \left(\frac{C-C1}{C2-C1}\right)$$

in this example because the color is in-between the achromatic colors 322 and the chromatic colors 320, that is, between defined thresholds for each of the achromatic colors 322 and the chromatic colors 320. Thus, in this example, the weights Cw1 and Cw2 are further weighted because the color is in-between the defined thresholds for the achromatic colors 322 and the chromatic colors 320. The various thresholds and values can be set and adjusted, for example, by a camera tuner (e.g., a person experienced in camera tuning).

It should be noted that below C1 is defined as achromatic and above C2 is defined as chromatic, with values between C1 and C2 being part achromatic and part chromatic ("in-between" color). Thus, based on the color temperature and lux level, a defined weighting is applied depending upon whether the color is one of the achromatic colors 322 and/or one of the chromatic colors 320. It should be noted that a new color appearance $$\left(\frac{B}{G}\right)_{new}$$

is calculated using the same Equation 2.

The camera color image processing pipeline 302 is thereby configured to use weight values from the tuning table 400 that define a color appearance model for the achromatic colors 322 and the chromatic colors 320. For example, lighting conditions are typically not neutral white, such as in a conference room having video conferencing capabilities, but instead has a lighting condition with some associated color cast. The camera color image processing pipeline 302 adapts the image data to the different lighting conditions in a way that mimics the human visual system, such that, for example, image data is weighted (e.g., based on the tuner weight values in the tuner table 400) so that white paper (achromatic objects) appear yellower under tungsten lighting and bluer under cloudy sunlight. That is, the camera color image processing pipeline 302 uses color appearance values 324 for the achromatic colors 322 and values for preferred color reproduction 326 for the chromatic colors 320, such as from the tuning table 400, to determine a new color appearance $$\left(\text{i.e., } \left(\frac{R}{G}\right)_{new}\right)$$

as defined by a weight value that adjusts a gain for the image data (e.g., different weights applied to the achromatic colors 322 and the chromatic colors 320). Saturation/hue enhancement 328, 330 is applied to separately processed image data for the achromatic colors 322 and the chromatic colors 320 to allow for adjusted colors. In one example, the adjusted colors 332 are a combination of blending and composition of the colors. The tuning table 400 generally defines the desired color appearance (R/G and B/G) for each color temperature that is tunable.

The output from the camera color image processing pipeline 302 is converted by a color space conversion 334. In one example, the color space conversion 334 includes JPEG encoding performed using color mapping techniques in the color space conversion technology. In some examples, JPEG compression is performed as part of the color space conversion. A final image 336 is output with an adjusted color appearance based on the separate color image processing of the achromatic colors 322 and the chromatic colors 320. In some examples, the present disclosure implements the complex human visual phenome in camera color processing by creating a separate custom color appearance models for the achromatic colors 322 and the chromatic colors 320. As a result, image quality and visual camera appearance is improved across all spectrum of lighting conditions/illumination levels for photos and videos including, for example, video conference calls. That this, the color image processing of the present disclosure does not treat all colors in the same manner or same direction at least in part by separately processing the achromatic colors 322 and the chromatic colors 320, and providing separate different weights for each of the achromatic colors 322 and the chromatic colors 320.

Figure 5:
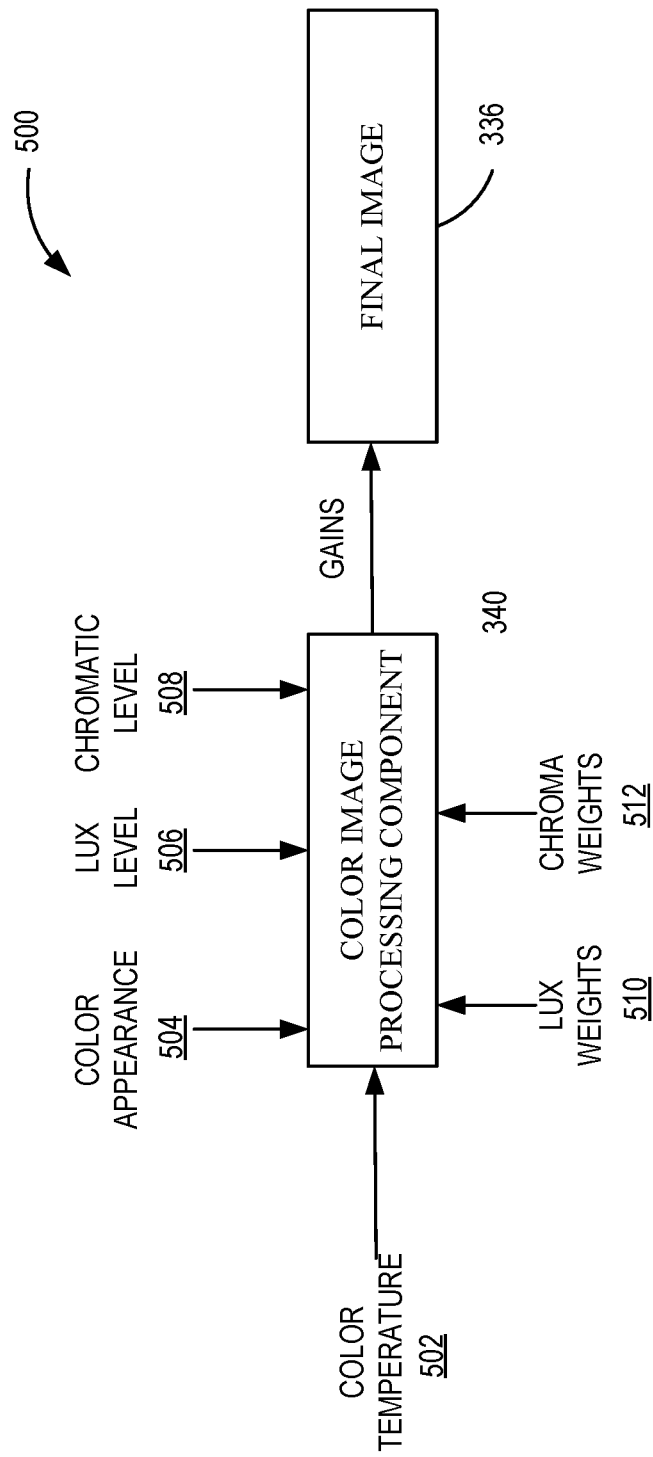
FIG. 5 illustrates a color image processing component according to an embodiment.

Thus, various examples perform camera color image processing by differently weighting the achromatic colors 322 and the chromatic colors 320 based on color temperature (e.g., CCT) and lux. As described herein, for different color temperature levels for each of the achromatic colors 322 and the chromatic colors 320, a different set of weights is provided. The weight in some examples is thereby based on image content, As illustrated in FIG. 5, the final image 336 is generated based on gains $$\left(\left(\frac{R}{G}\right)_{new} \text{ and } \left(\frac{B}{G}\right)_{new}\right)$$

calculated by the present disclosure. That is, the gains are calculated using the color image processing component 340 using different defined thresholds and weights. More particularly, and as described herein, some examples use the defined values in the tuning table 400 to calculate the gains to generate the final image 336. It should be appreciated that the gains can be applied at different levels of granularity, such as at the pixel level or object level. For example, the calculated gains are applied per pixel in some examples and per area in some examples.

The gains as calculated by the color image processing component 340 are based on thresholds and weights for each of a plurality of defined levels of color temperature 502, which are different for the achromatic colors 322 and the chromatic colors 320. That is, different thresholds and weights are used for different lighting conditions depending on whether the color is within the achromatic colors 322 or the chromatic colors 320. The lighting conditions can be defined, for example, based on different light sources used to illuminate an area (e.g., one or more different light sources in a conference room and imaged with a camera for video conferencing).

For each of the levels of the color temperature 502, a color appearance 504 defines the desired color characteristics for the final image 336. For example, the color appearance 504 defines gains (R/G and B/G) that are adjusted to calculate the new gains $$\left(\left(\left(\frac{R}{G}\right)_{new} \text{ and } \left(\frac{B}{G}\right)_{new}\right)\right)$$

to be applied. That is, tuner gain values are used and adjusted to new gain values based on camera color image processing described herein that separates the achromatic colors 322 and the chromatic colors 320.

Thresholds are also defined to further determine the weights to be applied for each of the color temperature 502. For example, different lux levels 506 define threshold values for different lighting condition (e.g., low light and high light conditions). Additionally, different chromatic levels 508 define threshold values to identify a color as being within the achromatic colors 322 or the chromatic colors 320.

With the above discussed measured color temperature 502 (e.g., CCT value) and based on the lighting condition (lux level) and whether the color is within the achromatic colors 322 and/or the chromatic colors 320, weights are applied to adjust the camera color image processing to generate new gains based on the gain defined by the values for the color appearance 504. That is, lux weights 510 and/or chroma weights 512 are applied based on (i) the light condition and (ii) whether the color is within the achromatic colors 322 and/or the chromatic colors 320, respectively. As a result, the final image 336 is more pleasing when being viewed, having colors that are more aligned with colors that would result from human visual and cognitive processing.

It should be noted that the threshold values and weights in one example are defined as illustrated in the tuning table 400 shown in FIG. 4. For example, depending upon camera characteristics and/or use-cases, one or more of the values for the weights can be optimized to reproduce the best visual experience on that camera.

Figure 8:
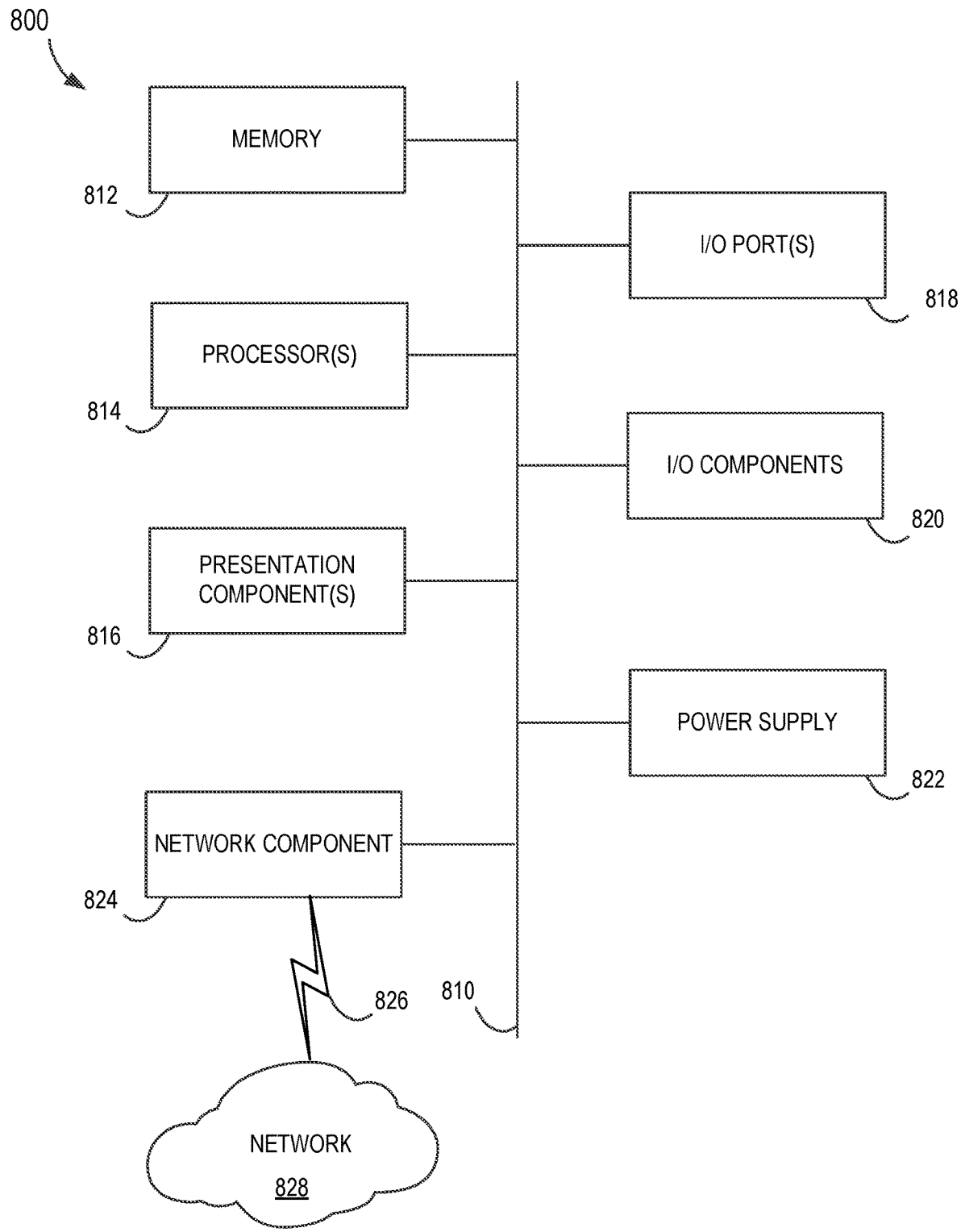
FIG. 8 is a block diagram of an example computing environment suitable for implementing some of the various examples disclosed herein.

It also should be appreciated that the output from various examples is also useful for further processing, for example in image processing operations performed by a computing device 800, which is described in more detail in relation to FIG. 8.

Figure 6:
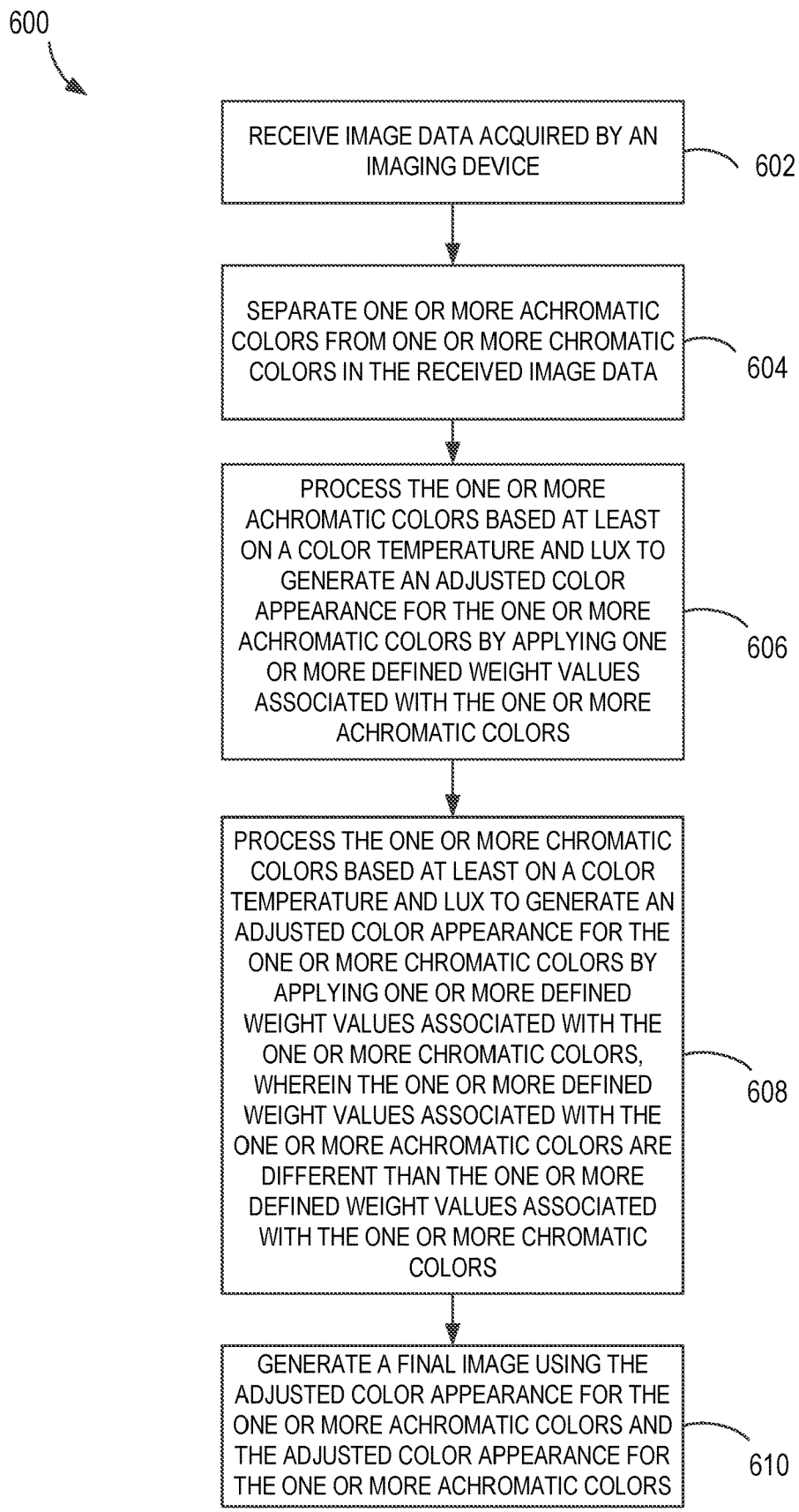
FIG. 6 is a flowchart of a process for camera color image processing according to an embodiment.

FIG. 6 is a flowchart 600 illustrating exemplary operations involved in camera color image processing. In some examples, the operations described for the flowchart 600 are performed by the computing device 800 of FIG. 8. The flowchart 600 commences at operation 602 with receiving image data acquired by an imaging device. For example, a camera acquires video conferencing images during an online video conferencing session. The camera is some examples in located in a conference room. However, in other examples, the camera forms part of a portable device, such as a laptop or tablet, and is operating to acquire images for video conferencing. It should be noted that the image data can be any type of images, such as still images or video.

At operation 604, one or more achromatic colors are separated from one or more chromatic colors in the received image data. As descried herein, defined threshold values are used in some examples to identify the achromatic colors 322 and the chromatic colors 320. The separation allows for separate processing of the achromatic colors 322 and the chromatic colors 320.

At operation 606, the one or more achromatic colors are then processed based at least on a color temperature and lux to generate an adjusted color appearance for the one or more achromatic colors by applying one or more defined weight values associated with the one or more achromatic colors. Additionally, at operation 608, the one or more chromatic colors are processed based at least on a color temperature and lux to generate an adjusted color appearance for the one or more chromatic colors by applying one or more defined weight values associated with the one or more chromatic colors. For example, as described herein, based at least on one or more defined threshold values, such as a low lux level or a high lux level, the corresponding one or more achromatic colors or one or more chromatic colors are processed by adjusting a gain setting thereof. As described herein, the new gain setting can be calculated using multiple weight values based on multiple thresholds. Moreover, in various examples, the defined weight values associated with the one or more achromatic colors are different than the defined weight values associated with the one or more chromatic color. As such, the new gain values are different for the processed one or more achromatic colors and the processed one or more chromatic colors.

It should be noted that the order of processing can be varied to process different portions of the separated data before or after other portions of the separated data.

At operation 610, a final image is generated using the adjusted color appearance for the one or more achromatic colors and the adjusted color appearance for the one or more chromatic colors. For example, images are generated that have improved characteristics for different lighting conditions, including to more closely resemble images created by the human eye in the different lighting conditions.

Thus, by creating separate custom color appearance models for achromatic colors and chromatic colors, various examples provide an improved image when displaying digital images, such as still images or video.

Figure 7:
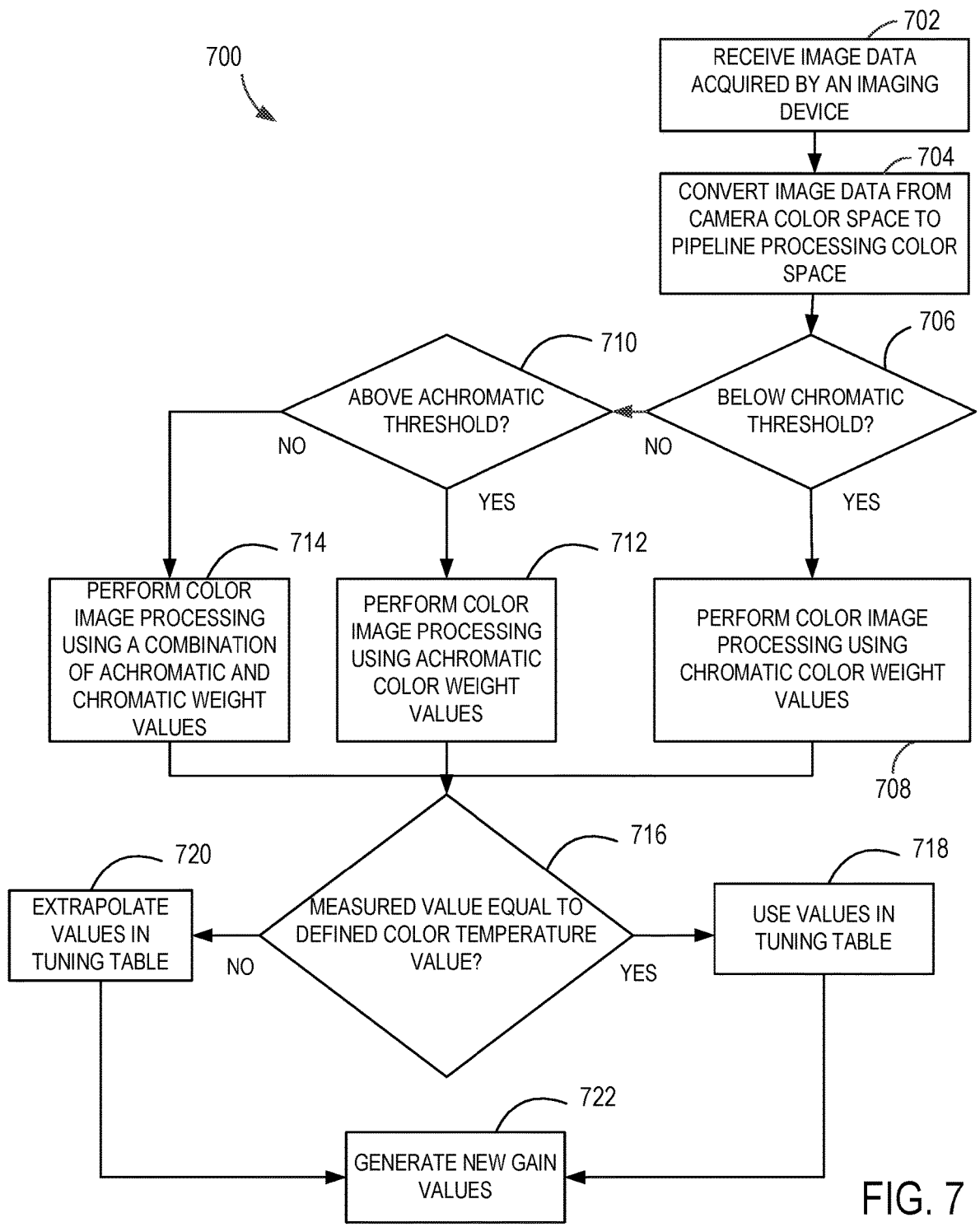
FIG. 7 is a flowchart of a process for generating color image processing gain values according to an embodiment.

FIG. 7 is a flowchart 700 illustrating exemplary operations involved in generating color image processing gain values. In some examples, the operations described for flowchart 700 are performed by the computing device 800 of FIG. 8. The flowchart 700 commences at operation 702 with receiving image data acquired by an imaging device. For example, a camera acquires video conferencing images during an online video conferencing session. The camera is some examples in located in a conference room. However, in other examples, the camera forms part of a portable device, such as a laptop or tablet, and is operating to acquire images for video conferencing. It should be noted that the image data can be any type of images, such as still images or video.

At operation 704, the received image data is converted from the camera color space to a pipeline processing color space to allow for more efficient camera color image processing in some examples. The conversion in one example is from the RGB color space to the YUV color space. However, other color conversions are contemplated by the present disclosure as described herein.

At operation 706, a determination is made whether the image data (e.g., pixel data) is below a chromatic threshold. That is, a determination is made whether the chromatic level of the portion or component of the image data to be processed is below a chromatic threshold value. If the value is below the chromatic threshold, then at operation 708 color image processing is performed using chromatic color weight values. If the value is not below the chromatic threshold, then at operation 710 a determination is made whether the value is above an achromatic threshold value. If the value is above the achromatic threshold then at operation 712 color image processing is performed using achromatic color weight values. If the value is not above the achromatic threshold, which means that the value is above the chromatic threshold value, but below the achromatic threshold value, the color is an in-between color, and then at operation 714 color image processing is performed using a combination of achromatic color weight values and chromatic color weight values.

After any of the operations 708, 712, or 714, a determination is made at operation 716 whether a measured color temperature value is equal to a defined color temperature value, such as in a tuning table. For example, a determination is made whether a determined CCT value (e.g., determined by the AWB control 202) is equal to one of the CCT values in the tuning table (e.g., the tuning table 400). If the values are equal (i.e., there is a match between the determined CCT value and a CCT value in the tuning table), then at 718, the weight values (and other threshold values, such as lux level values) in the tuning table associated with the CCT value are used in the camera color image processing (e.g., the camera color image processing pipeline 302 uses the table values). If the determined CCT value is not the same as (equal to) any of the defined CCT values in the tuning table, then at operation 720, extrapolated values are used. That is, an extrapolation operation is performed using mathematical extrapolation technique to determine extrapolated weight values (and other extrapolated threshold values, such as lux level values) between two CCT values.

New gain values for processing the image data are then generated at operation 722. That is, new gains $$\left(\left(\left(\frac{R}{G}\right)_{new} \text{ and } \left(\frac{B}{G}\right)_{new}\right)\right)$$

to be applied the image data are calculated as described herein and that are used to generate images with improved color appearance for different lighting conditions.

Thus, various examples perform camera color image processing with improved display characteristics. For example, in a video conferencing application, the displayed images from a remote video camera better align to human visual and cognitive processing.

ADDITIONAL EXAMPLES

Some aspects and examples disclosed herein are directed an image processing system comprising: a memory associated with a computing device, the memory including a camera color image processing component; and a processor that executes an image color processing system that uses the camera color image processing component to: receive image data acquired by an imaging device; separate one or more achromatic colors from one or more chromatic colors in the received image data; process the one or more achromatic colors based at least on a color temperature and lux to generate an adjusted color appearance for the one or more achromatic colors by applying one or more defined weight values associated with the one or more achromatic colors; process the one or more chromatic colors based at least on a color temperature and lux to generate an adjusted color appearance for the one or more chromatic colors by applying one or more defined weight values associated with the one or more chromatic colors, wherein the one or more defined weight values associated with the one or more achromatic colors are different than the one or more defined weight values associated with the one or more chromatic colors; and generate a final image using the adjusted color appearance for the one or more achromatic colors and the adjusted color appearance for the one or more achromatic colors.

Additional aspects and examples disclosed herein are directed to a computerized method for image processing, the computerized method comprising: receiving image data acquired by an imaging device; separating one or more achromatic colors from one or more chromatic colors in the received image data; processing the one or more achromatic colors based at least on a color temperature and lux to generate an adjusted color appearance for the one or more achromatic colors by applying one or more defined weight values associated with the one or more achromatic colors; processing the one or more chromatic colors based at least on a color temperature and lux to generate an adjusted color appearance for the one or more chromatic colors by applying one or more defined weight values associated with the one or more chromatic colors, wherein the one or more defined weight values associated with the one or more achromatic colors are different than the one or more defined weight values associated with the one or more chromatic colors; and generating a final image using the adjusted color appearance for the one or more achromatic colors and the adjusted color appearance for the one or more achromatic colors.

Additional aspects and examples disclosed herein are directed to one or more computer storage media having computer-executable instructions for image processing that, upon execution by a processor, cause the processor to at least: receive image data acquired by an imaging device; separate one or more achromatic colors from one or more chromatic colors in the received image data; process the one or more achromatic colors based at least on a color temperature and lux to generate an adjusted color appearance for the one or more achromatic colors by applying one or more defined weight values associated with the one or more achromatic colors; process the one or more chromatic colors based at least on a color temperature and lux to generate an adjusted color appearance for the one or more chromatic colors by applying one or more defined weight values associated with the one or more chromatic colors, wherein the one or more defined weight values associated with the one or more achromatic colors are different than the one or more defined weight values associated with the one or more chromatic colors; and generate a final image using the adjusted color appearance for the one or more achromatic colors and the adjusted color appearance for the one or more achromatic colors.

Alternatively, or in addition to the other examples described herein, examples include any combination of the following:

wherein the defined weight values associated with the one or more chromatic colors and associated with the one or more achromatic colors comprise at least one of a lux weight or a chroma weight;

wherein the color temperature comprises a correlated color temperature (CCT) and further comprising accessing a tuning table having defined values for the one or more defined weight values associated with the one or more achromatic colors and the one or more defined weight values associated with the one or more chromatic colors, the defined values corresponding to each of a plurality of CCT values;

wherein the defined values are tunable to change the color appearance, a color preference, and a color reproduction of the received image data;

wherein the defined values are set to generate the final image having a color appearance based on human visual and cognitive processing;

wherein the received image data is in the RGB color space and further comprising converting the received image data into the YUV color space and performing saturation/hue enhancement as part of the processing of the one or more achromatic colors and the one or more chromatic colors.

wherein the processor executes the image color processing system to use a weighted combination of the chroma color weight values associated with the one or more achromatic colors and chroma color weight values associated with the one or more chromatic colors with a lux weight to generate the final image; and using interpolation to adjust at least one of the one or more defined weight values associated with the one or more chromatic colors or the one or more defined weight values associated with the one or more achromatic colors.

While the aspects of the disclosure have been described in terms of various examples with their associated operations, a person skilled in the art would appreciate that a combination of operations from any number of different examples is also within scope of the aspects of the disclosure.

Example Operating Environment

FIG. 8 is a block diagram of an example computing device 800 for implementing aspects disclosed herein, and is designated generally as computing device 800. The computing device 800 is but one example of a suitable computing environment and is not intended to suggest any limitation as to the scope of use or functionality of the examples disclosed herein. Neither should the computing device 800 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

The computing device 800 includes a bus 810 that directly or indirectly couples the following devices: a computer-storage memory 812, one or more processors 814, one or more presentation components 816, input/output (I/O) ports 818, I/O components 820, a power supply 822, and a network component 824. While the computer device 800 is depicted as a seemingly single device, multiple computing devices 800 may work together and share the depicted device resources. For instance, the computer-storage memory 812 may be distributed across multiple devices, processor(s) 814 may provide housed on different devices, and so on.

The bus 810 represents what may be one or more busses (such as an address bus, data bus, or a combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and reiterate that the diagram of FIG. 8 is merely illustrative of an exemplary computing device that can be used in connection with one or more disclosed examples. Distinction is not made between such categories as "workstation," "server," "laptop," "hand-held device," etc., as all are contemplated within the scope of FIG. 8 and the references herein to a "computing device." The computer-storage memory 812 may take the form of the computer-storage media references below and operatively provide storage of computer-readable instructions, data structures, program modules and other data for the computing device 1000. For example, the computer-storage memory 812 may store an operating system, a universal application platform, or other program modules and program data. The computer-storage memory 812 may be used to store and access instructions configured to carry out the various operations disclosed herein.

As mentioned below, the computer-storage memory 812 may include computer-storage media in the form of volatile and/or nonvolatile memory, removable or non-removable memory, data disks in virtual environments, or a combination thereof. And the computer-storage memory 812 may include any quantity of memory associated with or accessible by the computing device 800. The memory 812 may be internal to the computing device 800 (as shown in FIG. 8), external to the computing device 800 (not shown), or both (not shown). Examples of the memory 812 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 800. Additionally, or alternatively, the computer-storage memory 812 may be distributed across multiple computing devices 800, e.g., in a virtualized environment in which instruction processing is carried out on multiple devices 800. For the purposes of this disclosure, "computer storage media," "computer-storage memory," "memory," and "memory devices" are synonymous terms for the computer-storage memory 812, and none of these terms include carrier waves or propagating signaling.

The processor(s) 814 may include any quantity of processing units that read data from various entities, such as the memory 812 or I/O components 820. Specifically, the processor(s) 814 are programmed to execute computer-executable instructions for implementing aspects of the disclosure. The instructions may be performed by the processor, by multiple processors within the computing device 800, or by a processor external to the client computing device 800. In some examples, the processor(s) 814 are programmed to execute instructions such as those illustrated in the flow charts discussed below and depicted in the accompanying drawings. Moreover, in some examples, the processor(s) 814 represent an implementation of analog techniques to perform the operations described herein. For example, the operations may be performed by an analog client computing device 800 and/or a digital client computing device 800. Presentation component(s) 816 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 800, across a wired connection, or in other ways. Ports 818 allow computing device 800 to be logically coupled to other devices including I/O components 820, some of which may be built in. Examples I/O components 820 include, for example but without limitation, a microphone, joystick, game pad, satellite dish, scanner, printer, wireless device, etc.

The computing device 800 may operate in a networked environment via the network component 824 using logical connections to one or more remote computers. In some examples, the network component 824 includes a network interface card and/or computer-executable instructions (e.g., a driver) for operating the network interface card. Communication between the computing device 800 and other devices may occur using any protocol or mechanism over any wired or wireless connection. In some examples, the network component 824 is operable to communicate data over public, private, or hybrid (public and private) using a transfer protocol, between devices wirelessly using short range communication technologies (e.g., near-field communication (NFC), Bluetooth™ branded communications, or the like), or a combination thereof. For example, network component 824 communicates over a communication link 826 with a network 828.

Although described in connection with an example computing device 1000, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Any range or device value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for digital ink parsing. The illustrated one or more processors 1014 together with the computer program code stored in memory 1012 constitute exemplary processing means for using and/or training neural networks.

The term "comprising" is used in this specification to mean including the feature(s) or act(s) followed thereafter, without excluding the presence of one or more additional features or acts.

In some examples, the operations illustrated in the figures can be implemented as software instructions encoded on a computer readable medium, in hardware programmed or designed to perform the operations, or both. For example, aspects of the disclosure can be implemented as a system on a chip or other circuitry including a plurality of interconnected, electrically conductive elements.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An image processing system comprising:
   a memory associated with a computing device, the memory including a camera color image processing component; and
   a processor that executes an image color processing system that uses the camera color image processing component to:
   receive image data acquired by an imaging device;
   separate one or more achromatic colors from one or more chromatic colors in the received image data;
   process the one or more achromatic colors based at least on a color temperature and lux to generate an adjusted color appearance for the one or more achromatic colors by applying one or more defined weight values associated with the one or more achromatic colors;
   process the one or more chromatic colors based at least on a color temperature and lux to generate an adjusted color appearance for the one or more chromatic colors by applying one or more defined weight values associated with the one or more chromatic colors, wherein the one or more defined weight values associated with the one or more achromatic colors are different than the one or more defined weight values associated with the one or more chromatic colors; and
   generate a final image using the adjusted color appearance for the one or more achromatic colors and the adjusted color appearance for the one or more chromatic colors.

2. The image processing system of claim 1, wherein the defined weight values associated with the one or more chromatic colors and associated with the one or more achromatic colors comprise at least one of a lux weight or a chroma weight.

3. The image processing system of claim 1, wherein the color temperature comprises a correlated color temperature (CCT) and the processor executes the image color processing system to access a tuning table having defined values for the one or more defined weight values associated with the one or more achromatic colors and the one or more defined weight values associated with the one or more chromatic colors, the defined values corresponding to each of a plurality of CCT values.

4. The image processing system of claim 3, wherein the defined values are tunable to change the color appearance, a color preference, and a color reproduction of the received image data.

5. The image processing system of claim 3, wherein the defined values are set to generate the final image having a color appearance based on human visual and cognitive processing.

6. The image processing system of claim 1, wherein the received image data is in the RGB color space and the processor executes a color space conversion components to convert the received image data into the YUV color space and executes the image color processing system to perform saturation/hue enhancement as part of the processing of the one or more achromatic colors and the one or more chromatic colors.

7. The image processing system of claim 1, wherein the processor executes the image color processing system to use a weighted combination of the chroma color weight values associated with the one or more achromatic colors and chroma color weight values associated with the one or more chromatic colors with a lux weight to generate the final image.

8. The image processing system of claim 1, wherein the processor executes the image color processing system to use interpolation to adjust at least one of the one or more defined weight values associated with the one or more chromatic colors or the one or more defined weight values associated with the one or more achromatic colors.

9. A computerized method for image processing, the computerized method comprising:
receiving image data acquired by an imaging device;
separating one or more achromatic colors from one or more chromatic colors in the received image data;
processing the one or more achromatic colors based at least on a color temperature and lux to generate an adjusted color appearance for the one or more achromatic colors by applying one or more defined weight values associated with the one or more achromatic colors;
processing the one or more chromatic colors based at least on a color temperature and lux to generate an adjusted color appearance for the one or more chromatic colors by applying one or more defined weight values associated with the one or more chromatic colors, wherein the one or more defined weight values associated with the one or more achromatic colors are different than the one or more defined weight values associated with the one or more chromatic colors; and
generating a final image using the adjusted color appearance for the one or more achromatic colors and the adjusted color appearance for the one or more chromatic colors.

10. The computerized method of claim 9, wherein the defined weight values associated with the one or more chromatic colors and associated with the one or more achromatic colors comprise at least one of a lux weight or a chroma weight.

11. The computerized method of claim 9, wherein the color temperature comprises a correlated color temperature (CCT) and further comprising accessing a tuning table having defined values for the one or more defined weight values associated with the one or more achromatic colors and the one or more defined weight values associated with the one or more chromatic colors, the defined values corresponding to each of a plurality of CCT values.

12. The computerized method of claim 11, wherein the defined values are tunable to change the color appearance, a color preference, and a color reproduction of the received image data.

13. The computerized method of claim 11, wherein the defined values are set to generate the final image having a color appearance based on human visual and cognitive processing.

14. The computerized method of claim 9, wherein the received image data is in the RGB color space and further comprising converting the received image data into the YUV color space and performing saturation/hue enhancement as part of the processing of the one or more achromatic colors and the one or more chromatic colors.

15. The computerized method of claim 9, further comprising using a weighted combination of the chroma color weight values associated with the one or more achromatic colors and chroma color weight values associated with the one or more chromatic colors with a lux weight to generate the final image.

16. The computerized method of claim 9, further comprising using interpolation to adjust at least one of the one or more defined weight values associated with the one or more chromatic colors or the one or more defined weight values associated with the one or more achromatic colors.

17. One or more computer storage media having computer-executable instructions for image processing that, upon execution by a processor, cause the processor to at least:
receive image data acquired by an imaging device;
separate one or more achromatic colors from one or more chromatic colors in the received image data;
process the one or more achromatic colors based at least on a color temperature and lux to generate an adjusted color appearance for the one or more achromatic colors by applying one or more defined weight values associated with the one or more achromatic colors;
process the one or more chromatic colors based at least on a color temperature and lux to generate an adjusted color appearance for the one or more chromatic colors by applying one or more defined weight values associated with the one or more chromatic colors, wherein the one or more defined weight values associated with the one or more achromatic colors are different than the one or more defined weight values associated with the one or more chromatic colors; and
generate a final image using the adjusted color appearance for the one or more achromatic colors and the adjusted color appearance for the one or more chromatic colors.

18. The one or more computer storage media of claim 17, wherein the defined weight values associated with the one or more chromatic colors and associated with the one or more achromatic colors comprise at least one of a lux weight or a chroma weight, and the color temperature comprises a correlated color temperature (CCT) and having further computer-executable instructions that, upon execution by a processor, cause the processor to at least access a tuning table having defined values for the one or more defined weight values associated with the one or more achromatic colors and the one or more defined weight values associated with the one or more chromatic colors, the defined values corresponding to each of a plurality of CCT values.

19. The one or more computer storage media of claim 17, wherein the defined values are tunable to change the color appearance, a color preference, and a color reproduction of the received image data, and having further computer-executable instructions that, upon execution by a processor, cause the processor to at least perform saturation/hue enhancement as part of the processing of the one or more achromatic colors and the one or more chromatic colors, the defined values being set to generate the final image having a color appearance based on human visual and cognitive processing.

20. The one or more computer storage media of claim 17 having further computer-executable instructions that, upon execution by a processor, cause the processor to at least use a weighted combination of the chroma color weight values associated with the one or more achromatic colors and chroma color weight values associated with the one or more chromatic colors with a lux weight to generate the final image, and use interpolation to adjust at least one of the one or more defined weight values associated with the one or more chromatic colors or the one or more defined weight values associated with the one or more achromatic colors.

* * * * *